Feb. 26, 1952 R. J. KACENA 2,587,046
ADJUSTABLE WHEEL MOUNTING FOR
CONCRETE MIXERS OR THE LIKE
Filed June 2, 1951
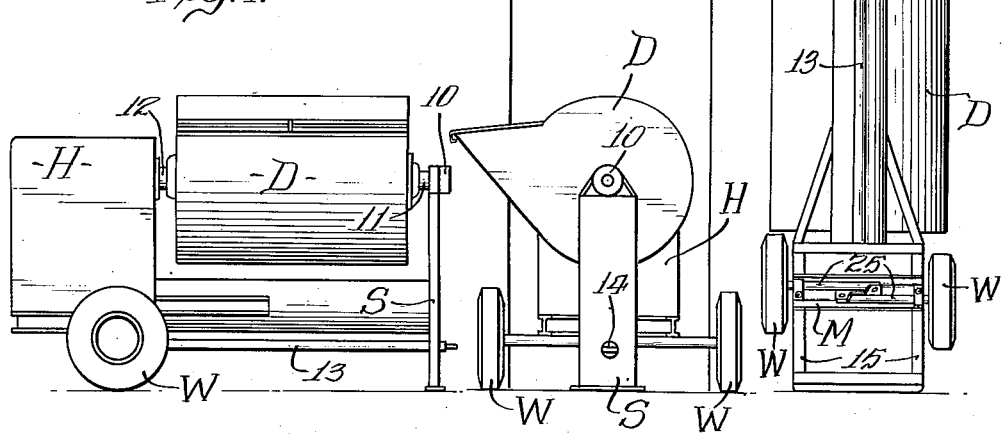
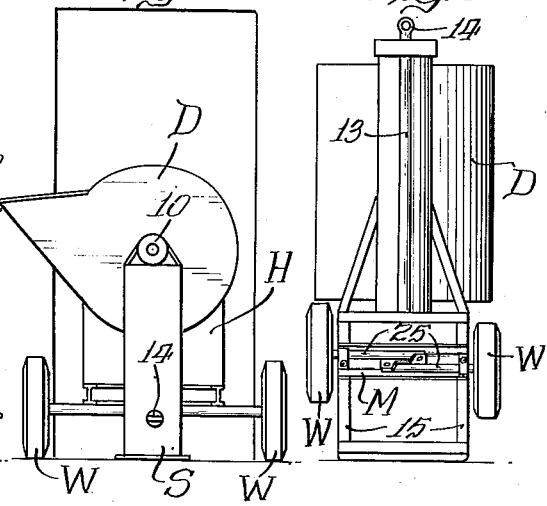
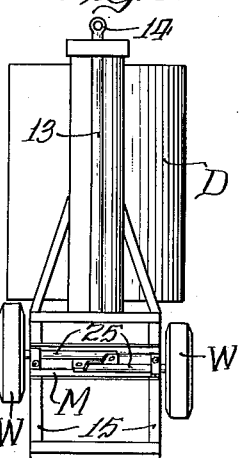
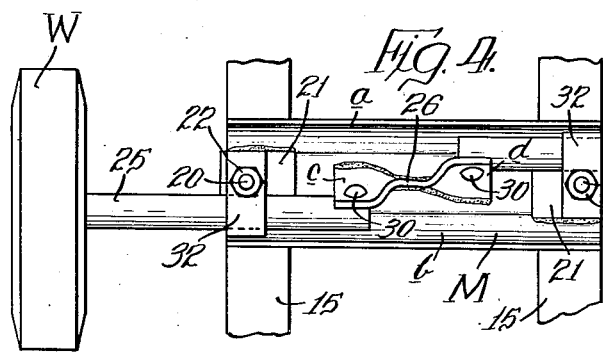
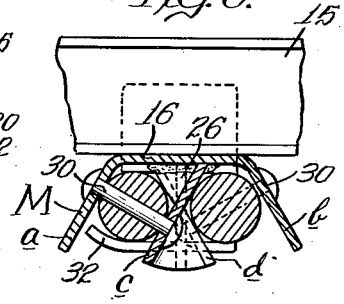
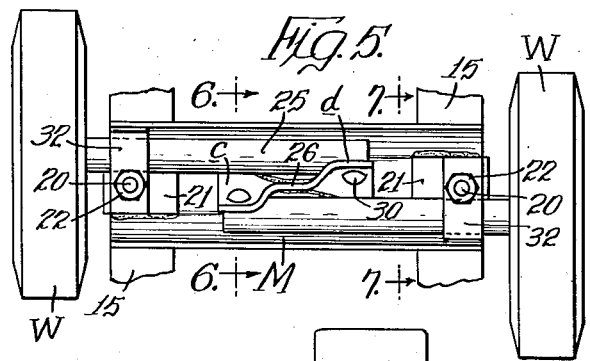
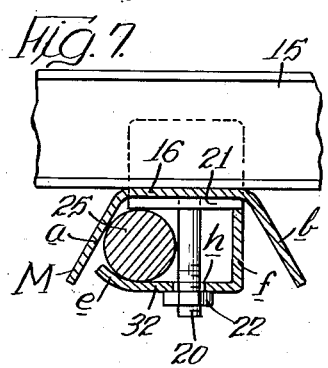
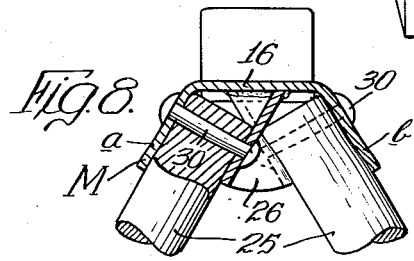
INVENTOR.
Richard J. Kacena
BY Patented Feb. 26, 1952

2,587,046

UNITED STATES PATENT OFFICE 2,587,046

ADJUSTABLE WHEEL MOUNTING FOR CONCRETE MIXERS OR THE LIKE

Richard J. Kacena, Chicago, Ill.

Application June 2, 1951, Serial No. 229,598

6 Claims. (Cl. 280—34)

This invention relates to a portable construction machine such as a power operated mixer for concrete or the like, having at one end a pair of ground wheels supporting a chassis which carries a motor enclosed within a housing at one end of a rotatable drum. The improvements with which this invention is concerned relate to the mounting of the ground wheels upon the mixer chassis and the means provided for two-position adjustment of the stub axles whereon the wheels are carried.

In ordinary use the ground wheels of a portable mixer should be spaced apart the distance that is necessary to provide stability for the structure. This distance usually exceeds the maximum width of the structure that is mounted on the chassis. When towed along the highway from one place to another, this distance between wheels should be greater than when the mixer is stationary. When on the job, however, the wheel spacing may prove too wide for the mixer to enter a work elevator, pass through a stairwell, or traverse a doorway opening. To meet this difficulty the ground wheel mountings, according to the present invention, are adjustable so that the wheels may be moved toward or from each other thereby to shorten or lengthen the spacing therebetween. As an example, if the normal spacing for road towing be 42", the narrower spacing requisite for movement onto an elevator, or through a stairwell, or door opening, may not be more than 30" or so.

The mountings herein disclosed are simple, sturdy, and effective to permit a two-position adjustment in the spacing between the ground wheels. Furthermore, the mountings which are positioned on the underside of the mixer chassis are so designed as to be conveniently available for adjustment by the simple expedient of upending the mixer for resting upon the front end of its motor housing. Later, when the mounting adjustment from one position to the other has been completed, the mixer is swung down to its normal horizontal position ready to be moved on to its destination.

A suggestive embodiment of this invention is illustrated in the accompanying drawing wherein:

Figure 1 is a diagrammatic view in side elevation of a conventional power-operated mixer, showing the position of its ground wheels in relation to the motor housing, mixing drum, etc.;

Fig. 2 is a similar view in elevation looking toward the forward end of the mixer, showing the normal wide spacing of its wheels in relation to a doorway opening in the background;

Fig. 3 is a view in elevation of the underside of the mixer as it appears when upended on its motor housing to position its wheel mountings conveniently for manipulation;

Fig. 4 is an enlarged detail in elevation, looking toward the wheel mountings as they appear when the ground wheels are spaced apart the long distance;

Fig. 5, which is a similar view, shows the mounting adjusted to reduce to the short distance the spacing between the wheels;

Figs. 6 and 7 are transverse sections, somewhat enlarged, taken on lines 6—6 and 7—7, respectively, of Fig. 5; and Fig. 8 is a similar view taken on line 6—6 of Fig. 5, showing the stub axles at the mid-point in the movement between their two positions of adjustment.

As represented in Figure 1, the construction machine, here shown as a mixer for concrete and the like, is one with which this invention may be advantageously used. It comprises a pair of ground wheels W rotatably mounted below the mixer chassis whereon is carried a housing H at its rear end and adjacent thereto a mixing drum D. A stand S which is provided at the front end of the mixer is affixed rigidly to the chassis. Near its upper end the stand carries a bearing 10 wherein is journaled a trunnion 11 at the front end of the drum, and at its opposite end a hollow shaft 12 extends from the drum to be supported in a second bearing at the rear of the housing H. A second shaft (not shown) is operatively extended between a suitable power plant within the housing H and a mixing blade unit that is rotatably mounted with the drum. There is also connected to the chassis on its underside a tow bar 13 which extends through the stand S at its front end where it is provided with an eye 14 to facilitate attachment to a towing vehicle.

According to this invention, a mounting member M crosswise of the chassis is affixed to its longitudinal members 15. This member may be in the form of a downwardly facing channel having a base 16 and outwardly diverging sides $a$ and $b$. A post 20 depends from the base 16, one near each end thereof and substantially midway of its width. To anchor each post in place, a thin rectangular plate 21 may be affixed to its upper end, the plate then being secured, as by welding, to the channel base 16. The lower end portion of each post is formed with screw threads to receive a coacting nut 22.

Each wheel W is rotatably mounted at one end of a stub axle 25 which extends lengthwise within the mounting member M, i. e. crosswise of the chassis. The two stub axles are in horizontal offset relation with each other, separated only by a bracket plate 26 which depends from the mounting base 16 to which it is affixed securely, as by welding. The two ends of this bracket plate are oppositely inclined to provide bearings c and d which are substantially parallel with the carrier sides a and b, respectively, but spaced therefrom to coact therewith, each for anchorage of opposite ends of a pivot pin 30 extending therebetween. Within the space between each bearing and its coacting mounting wall is accommodated the end portion of one of the stub axles 25 through which the pin 30 is transversely extended to provide a pivotal mounting therefor. These pivotal mountings are located an equal distance off-center of the length of the mounting base 16, and permit each stub axle to swing through a range of 180° so that its supported wheel W may be positioned at one side or the other of the mixer chassis, but at unequal distances therefrom.

To secure each stub axle in each of its two adjusted positions, there is provided a pair of clips 32, each having its body inclined in one end portion e and having an opposite end portion f in substantially right angular relation therewith. A hole h formed in each clip body permits one of the posts 20 to pass therethrough to receive the nut 22 on its threaded outer end portion. When the nut is rotatably advanced on the post, it exerts pressure on the clip body so that its inclined end portion e engages the proximate stub axle 25 tightly to hold it fixedly at the juncture of the mounting base 16 with the proximate post plate 21; the opposite end portion f of the clip is then rested on the same post plate and serves as a fulcrum for the clip which, acting as a lever of the third class, maintains its pressure effectively on the stub axle to one side of the post 20.

The pivotal mountings provided by the anchored pins 30 are spaced apart an equal distance from a point which is midway of the length of the mounting base 16. If they be separated by a distance of 6" or each 3" from center, then the wheels which are mounted on the stub axles will, in one adjusted position thereof, be disposed outwardly of the mixer chassis by a distance which is 12" greater than in the oppositely adjusted position. These two positions are indicated in Figures 4 and 5. The stub axles which overlap to a limited extent are offset horizontally so as to avoid interference when swinging past each other; additionally, by preference, they are pivotally mounted to swing about axes which diverge from a low point therebetween so that, at the midpoint of their swing, their supported wheels are also clear of each other. This feature is illustrated in Fig. 8. In each adjusted position of both stub axles, the associated clip 32 is applied to its post 20 to secure the stub axle fixedly in place so that the ground wheels will be operative to support the mixer either when in transit, or stationary, or while operating.

I claim:

1. A mounting for the ground wheels of a portable concrete mixer or the like supported on a chassis comprising a stub axle in operative connection with each wheel extending axially thereof crosswise of the chassis toward the other wheel, and offset horizontally with respect to the stub axle thereof and in overlapping relation thereto for a limited distance when in one position relative thereto, means establishing a pivotal connection between the chassis and the overlapping end of each stub axle transversely of the axis of the wheel mounted thereon and so arranged that the axes of both mountings approach the horizontal whereby to permit each stub axle to swing through substantially 180° to extend beyond one side of the chassis for a relatively short distance or beyond the opposite side of the chassis for a relatively great distance, the spacing between the wheels carried thereby being correspondingly shortened or lengthened, and means engaging with each stub axle and coacting with the chassis to secure the stub axle fixedly in either of its two adjusted positions.

2. A mounting for the ground wheels of a portable concrete mixer or the like supported on a chassis comprising a stub axle in operative connection with each wheel extending axially thereof crosswise of the chassis toward the other wheel, and offset horizontally with respect to the stub axle thereof and in overlapping relation thereto for a limited distance, means establishing a pivotal connection between the chassis and the overlapping end of each stub axle and so arranged that the axes of both mountings are in diverging relation from a low point therebetween while swinging toward the midpoint of its range to move progressively further away from the other stub shaft to a position of maximum clearance therewith, and when swung through substantially 180° to extend beyond one side of the chassis for a relatively short distance or beyond the opposite side of the chassis for a relatively great distance, the spacing between the wheels carried thereby being correspondingly shortened or lengthened, and means engaging with each stub axle and coacting with the chassis to secure the stub axle fixedly in either of its two adjusted positions.

3. A mounting for the ground wheels of a portable concrete mixer or the like supported on a chassis comprising an elongated mounting member affixed to the underside of the chassis extending transversely thereof and comprising a base from which is depended a pair of outwardly diverging sides, bearings depending from the mounting base intermediately of its sides and inclined, one parallel with each thereof, in spaced relation thereto for coaction therewith, a stub axle in operative connection with each wheel and extending axially thereof past center lengthwise of the mounting base and between one of its sides and its coacting bearing and substantially in engagement with each thereby to be restrained from lateral movement at that point, a pivot pin extended through each stub axle adjacent its end and between each base side and coacting bearing and anchored thereto at points equidistant from the transverse centers of the chassis, the axes of the two pivot pins approaching the horizontal to permit each stub axle to swing through substantially 180° to extend beyond one side of the chassis for a relatively short distance or beyond the opposite side of the chassis for a relatively great distance, the spacing between the wheels carried thereby being correspondingly decreased or increased, and means engaging with each stub axle and coacting with the mounting base to secure the stub axle fixedly in either of its two adjusted positions.

4. A mounting for the ground wheels of a portable concrete mixer or the like supported on a chassis comprising an elongated mounting member affixed to the underside of the chassis extending transversely thereof and comprising a base from which is depended a pair of outwardly diverging sides, bearings depending from the mounting base intermediately of its sides and inclined, one parallel with each thereof, in spaced relation thereto for coaction therewith, a stub axle in operative connection with each wheel and extending axially thereof past center lengthwise of the mounting base and between one of its sides and its coacting bearing and substantially in engagement with each thereby to be restrained from lateral movement at that point, a pivot pin extended through each stub axle adjacent its end and between each base side and coacting bearing and anchored thereto at points equidistant from the transverse centers of the chassis, the axes of the two pivot pins being disposed in diverging relation from a low point therebetween whereby to permit each stub axle, while swinging toward the midpoint of its range, to move progressively further away from the other stub shaft to a position of maximum clearance therewith, and when swung through substantially 180° to extend beyond one side of the chassis for a relatively short distance or beyond the opposite side of the chassis for a relatively great distance, the spacing between the wheels carried thereby being correspondingly decreased or increased, and means engaging with each stub axle and coacting with the mounting base to secure the stub axle fixedly in either of its two adjusted positions.

5. A mounting for the ground wheels of a portable concrete mixer or the like supported on a chassis comprising an elongated mounting member affixed to the underside of the chassis extending transversely thereof and comprising a base from which is depended a pair of outwardly diverging sides, bearings depending from the mounting base intermediately of its sides and inclined, one parallel with each thereof, in spaced relation thereto for coaction therewith, a stub axle in operative connection with each wheel and extending axially thereof past center lengthwise of the mounting base and between one of its sides and its coacting bearing and substantially in engagement with each thereby to be restrained from lateral movement at that point, a pivot pin extended through each stub axle adjacent its end and between each base side and coacting bearing and anchored thereto at points equidistant from the transverse center of the chassis, the axes of the two pivot pins approaching the horizontal to permit each stub axle to swing through substantially 180° to extend beyond one side of the chassis for a relatively short distance or beyond the opposite side of the chassis for a relatively great distance, the spacing between the wheels carried thereby being correspondingly decreased or increased, a pair of posts with screw threaded portions depending from the mounting base, one near each end thereof, and positioned centrally of the mounting base transversely thereof to lie close to and substantially engage whichever stub axle is extended proximate thereto, a clip having an apertured body through which the post is extended, and formed with opposite ends of which one is engaged with the mounting member and the other with the underface of the stub axle for securement thereof, and screw means coacting with the post for applying pressure axially thereof to the clip body whereby to transmit pressure therefrom to the stub axle laterally thereof for securing it immovably to the mounting member.

6. A mounting for the ground wheels of a portable concrete mixer or the like supported on a chassis comprising an elongated mounting member affixed to the underside of the chassis extending transversely thereof and comprising a base from which is depended a pair of outwardly diverging sides, bearings depending from the mounting base intermediately of its sides and inclined, one parallel with each thereof, in spaced relation thereto for coaction therewith, a stub axle in operative connection with each wheel and extending axially thereof past center lengthwise of the mounting base and between one of its sides and its coacting bearing and substantially in engagement with each thereby to be restrained from lateral movement at that point, a pivot pin extended through each stub axle adjacent its end and between each base side and coacting bearing and anchored thereto at points equidistant from the transverse center of the chassis, the axes of the two pivot pins approaching the horizontal to permit each stub axle to swing through substantially 180° to extend beyond one side of the chassis for a relatively short distance or beyond the opposite side of the chassis for a relatively great distance, the spacing between the wheels carried thereby being correspondingly decreased or increased, a pair of posts with screw threaded portions depending from the mounting base, one near each end thereof, and positioned centrally of the mounting base transversely thereof to lie close to and substantially engage whichever stub axle is extended proximate thereto, and screw means engaging with each stub axle and coacting with the post proximate thereto for movement axially thereof to maintain a clamping pressure against the engaged stub axle for securing the same fixedly in its adjusted position.

RICHARD J. KACENA.

REFERENCES CITED

The following references are of record in the file of this patent:

UNITED STATES PATENTS

| Number | Name | Date |
|---|---|---|
| 2,470,272 | Trimmer | May 17, 1949 |
| 2,499,052 | Brookins | Feb. 28, 1950 |

FOREIGN PATENTS

| Number | Country | Date |
|---|---|---|
| 715,140 | France | Apr. 13, 1931 |